P. P. HINCKLEY.
COMBINED VALVE LIFTER AND HAND VISE.
APPLICATION FILED AUG. 29, 1919.
1,350,803. Patented Aug. 24, 1920.
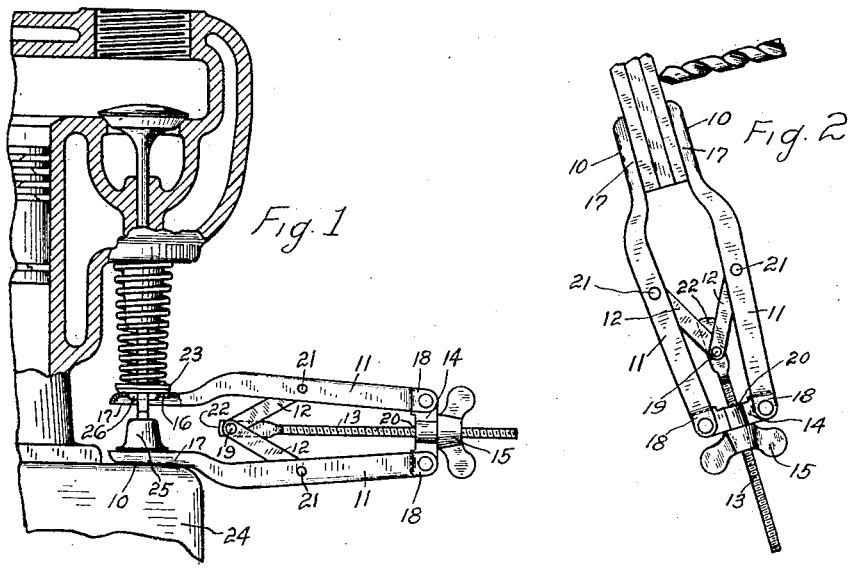
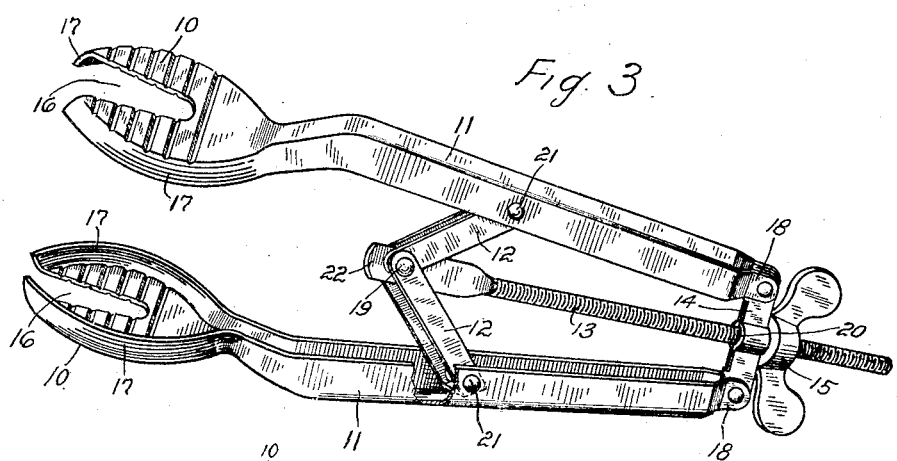
WITNESSES:
INVENTOR
Percy P Hinckley
BY
ATTORNEY

UNITED STATES PATENT OFFICE.

PERCY P. HINCKLEY, OF MERIDEN, CONNECTICUT, ASSIGNOR TO FOSTER, MERRIAM & COMPANY, OF MERIDEN, CONNECTICUT, A CORPORATION OF CONNECTICUT.

COMBINED VALVE-LIFTER AND HAND-VISE.

1,350,803.      Specification of Letters Patent.     Patented Aug. 24, 1920.

Application filed August 29, 1919. Serial No. 320,601.

*To all whom it may concern:*

Be it known that I, PERCY P. HINCKLEY, a citizen of the United States, residing at 212 Colony street, Meriden, county of New Haven, State of Connecticut, have invented an Improvement in Combined Valve-Lifters and Hand-Vises, of which the following is a specification.

This invention has for its object to provide a simple and inexpensive hand tool adapted for use either as a valve lifter or a hand vise, which shall operate on the toggle principle and shall be so designed and organized as to eliminate castings.

With these objects in view I have devised the novel valve lifter and vise which I will now describe referring to the accompanying drawing forming a part of this specification and using reference characters to indicate the several parts.

Figure 1 is a view partly in elevation and partly in section illustrating the use of my novel tool as a valve lifter;

Fig. 2 a view illustrating its use as a hand vise;

Fig. 3 a perspective view of the tool on an enlarged scale, and

Fig. 4 is a view similar to Fig. 2 showing a modification in which the plunger is threaded at its outer end only and a short length of tubing is passed over the cylinder for the wing nut to bear against when using the tool as a vise.

10 denotes the jaws, 11 the shanks, 12 the toggle levers, 13 the plunger, 14 the bridge and 15 the wing nut. Each jaw and its shank is stamped in one piece of sheet metal, these members being interchangeable. The jaws are provided with slots 16 to receive a valve stem and with strengthening flanges 17 at their edges. These flanges extend to the shanks where they widen out leaving the shanks U-shaped in cross section. At the ends of the shanks are lugs 18 which are pivoted at the ends of the bridge. The bridge in practice is formed from two stamped pieces of metal, each provided at its midlength with a half socket which together form a socket 20 through which the plunger may slide freely. The toggle levers are made from strips of sheet metal bent at their midlength to elongated U-shape so that each toggle lever comprises two branches. The connected ends of these branches are pivoted in the troughs, that is between the sides of the shanks, as at 21, and their other ends are pivoted as at 19 to a head 22 at the inner end of the plunger. The plunger is a length of rod and the head is formed by flattening one end of it. In the form illustrated in Figs. 1, 2 and 3 the plunger is threaded in its entire length, but in the form illustrated in Fig. 4 only the outer end of the plunger is threaded and a short length of tubing is used in coöperation with the wing nut when the device is used as a hand vise. The parts are so designed and assembled that the toggle levers may be swung past their dead center in either direction, compare Fig. 1 with Figs. 2 and 4. When the plunger is forced inward and the toggle levers are swung forward past their dead center, as in Fig. 1, the device is adapted for use as a valve lifter. The jaws would be brought close enough together so that one would pass under the washer, indicated by 23, which supports the spring, the other jaw resting upon the cylinder crank case, indicated by 24, or possibly upon the tappet guide, indicated by 25. The purpose is of course to raise the washer so that the pin 26 may be removed. As is well known the details of construction of different makes of motor cars vary greatly and it is unimportant so far as the present invention is concerned just how the device is used to accomplish the desired result. Having placed the tool in position the wing nut is turned forward on the shank and caused to bear upon the bridge. The effect is to draw the plunger outward and by means of the toggle levers to separate the jaws, raise the washer, and compress the spring so that the pin may be readily pulled out which enables the valve to be removed.

When it is required to use the tool as a vise, the wing nut is turned inward on the plunger and the toggle levers are swung outward past their dead center. Continued inward movement of the wing nut will cause the jaws to grip an article and hold it securely, as in Fig. 2, thus making of the tool a very strong and tightly gripping hand vise. If preferred the outer end only of the plunger may be threaded, as in Fig. 4, and a short piece of tubing interposed between the wing nut and the bridge, the wing nut being first removed, then the piece of tubing sliped over the the plunger, and then the wing nut turned against the outer end of the tube, the result being the same as before.

Having thus described my invention, I claim:

1. A tool of the character described comprising jaws having slots to receive a valve stem, strengthening flanges at their edges and U-shaped shanks, a bridge to which the shanks are pivoted, a threaded plunger which slides freely through the bridge and is provided with a flattened head, toggle levers formed from strips of metal bent at their midlengths, the branches of said levers being pivoted to the flattened head of the plunger and their connected ends being pivoted between the sides of the shanks, and a wing nut on the plunger adapted to bear against the bridge.

2. A tool of the character described comprising stamped metal jaws and shanks, the jaws being provided with slots to receive a valve stem and with strengthening flanges at their edges and the shanks being formed trough shape, a bridge to which the shanks are pivoted and which is formed from stamped pieces of metal each having a half socket at its midlength which together form a socket, a threaded plunger which slides freely through the socket and is provided with a head, toggle levers formed from strips of metal bent at their midlengths, the branches being pivoted to the head of the plunger and the connected ends pivoted in the troughs of the shanks, and a wing nut engaging the thread on the plunger.

In testimony whereof I affix my signature.

PERCY P. HINCKLEY.